Patented Nov. 22, 1938

2,137,995

UNITED STATES PATENT OFFICE 2,137,995

ORGANIC PRODUCT AND PROCESS OF MAKING THE SAME

Allen D. Whipple, Alexandria, Ind., assignor to The Mantle Lamp Company of America, Chicago, Ill., a corporation of Illinois No Drawing. Application November 30, 1931, Serial No. 578,197

3 Claims. (Cl. 134—79)

This invention relates to synthetic substances, coating and molding compositions, lacquers and enamels, and films and objects made therefrom, and particularly to lacquers, enamels, and molding materials wherein these synthetic coating compositions dissolved by, dispersed in, and combined with cellulose esters, impart certain new and useful characteristics to the lacquers and enamels and molding compounds and to the films and objects made therefrom, all as more particularly hereinafter described.

The invention has as an object, the production of new synthetic substances of practically zero volatility at ordinary temperatures, which in and of themselves combine in a single material, many of the properties of resins, gums, and also solvent softeners of the class which have come to be known in the plastics and surface coating industry as plasticizers.

Another object of the invention is the production of synthetic lacquers and enamel compositions having the properties of depositing films and protective coatings possessing the characteristics of great transparency, in clear coatings, of great adhesion to surfaces to be coated, great fullness and body, great permanence of lustre, great durability, great resistance to the destructive influences of water, light, and weather, great toughness and flexibility, and of being non-shrinking, and after having been thoroughly dried, being very resistant to re-solution and attack, even by the usual lacquer solvents.

A further object of the invention is to provide such compositions wherein the total content of solids exclusive of pigments, may be so increased by additions of the new synthetic substances herein described, as to give fullness to the films deposited from lacquers when they have been thinned down to a viscosity suitable for spraying or dipping (between 100 and 300 centipoises as measured by the Stormer Viscometer at 28° C.), without the necessity of resorting to the use of those cellulose esters previously used for this purpose, which have certain specific low viscosity characteristics.

A further object of the invention is to provide properly plasticized synthetic molding compositions.

Other objects of my invention will be apparent as the following description proceeds.

Cellulose nitrate is a cellulose ester commonly used as an ingredient for lacquers.

A lacquer or enamel having "fullness" is one which requires the application of a less number of coats to form a deposited film of desired thickness, than would otherwise be required.

Wherever in this specification, the terms cellulose nitrate, nitro-cellulose, and pyroxylin are used, they should be construed as being synonymous.

As a basis for illustrating the novelty and desirability of my invention, in so far as its ability to modify the properties of solutions of cellulose esters and particularly cellulose nitrate is concerned, a short narration of the development of the use of plasticizing and molding compositions is given.

Cellulose nitrate in solution in ether and alcohol, was used at an early date under the name of collodion as a coating to form a protective sheath over cuts and scratches. The film puckered and contracted on drying. For most purposes, this property was undesirable by reason of its contraction, and its tendency to peel off. To overcome this fault, various materials such as camphor, Canada Balsam, and castor oil were incorporated in the collodion, and the flexible collodion of the Pharmacopoeia resulted.

When cellulose nitrate solutions, also known as pyroxylin solutions, began to be used for other purposes, the same difficulty was encountered. The coating bridged away from irregularities of the coated surface, or was too brittle for use on supple material like leather, or could not endure the warping of woods to which it was applied. Plasticizers were essential to modify the properties of the cellulose nitrate. The literature of the pyroxylin industry is cumbered with literally hundreds of compounds that are considered efficacious for that purpose. Of these, only a dozen or so are of any present practical importance.

The early celluloid lacquers used the camphor present in celluloid as the plasticizer. It was in a measure effective, but in time, the camphor volatilized and disappeared and the film became brittle.

Various drying oils, such as linseed oil, have been incorporated in pyroxylin solutions, but since these materials absorb oxygen from the air, and polymerize to hard resinous bodies, their incorporation in pyroxylin solutions which dry almost entirely by evaporation of solvents, was detrimental, and caused the film to become brittle in a short time.

Non-drying oils gave better results, and castor oil may be used to illustrate this class of materials. It is slow drying, but has the undesirable habit of making the film too soft if used in slight excess. Under the influence of moderate heating, it exudes from the coating and the nitro-cellulose film becomes brittle.

Triphenyl phosphate, tricresyl phosphate and dibutyl phthalate have all been considered useful as plasticizers, and have been used as substitutes for camphor, but they all have definite rates of volatilization, and since pyroxylin films deposited with this class of plasticizers are plastic only by reason of being very concentrated solutions, it is evident that as soon as the solvent has volatilized, the original brittleness of the cellulose nitrate asserts itself.

Practically all lacquers and enamels include certain amounts of resin. There are several reasons for their inclusion therein. They increase the solid content in the lacquer and enamels, without raising the viscosity of the solution as rapidly as would be the case if cellulose nitrate alone were used to produce the solid content of the coating. A high total solids content gives fullness to the film. Resins also enhance the gloss of the film deposited from cellulose nitrate lacquers. Resins also promote the adhesion of the lacquer films to surfaces. Resins are incorporated in lacquers and enamels for the further purpose of rendering the deposited coatings more or less resistant to water. Heretofore, clear pyroxylin lacquers have found only limited application out of doors by reason of the fact that the short wave lengths of sunlight destroy the films too quickly by bringing about the types of failure known as chalking, alligatoring, checking or peeling. Pigmented lacquers or enamels of the prior-art, depend upon the inclusion of finely-divided pigments to protect the film from the destructive effects of light by absorbing the harmful rays of short wave length.

In the manufacture of nitro-cellulose lacquers and enamels, prior to the discovery of such low viscosity nitro-cellulose as that described by several inventors, it was not practicable to make solutions having a nitro-cellulose content, which, after thinning to the extent required for use as a dipping or spraying lacquer, namely, 100 to 300 centipoises as measured by the Stormer Viscometer at 28° C., was of more than about 6%, since with ordinary nitro-cellulose, more than this proportion rendered the solution too viscous. Moreover, in the presence of this maximum amount of nitro-cellulose, the proportion of the gum used to promote gloss and adhesion, had to be comparatively low, so that, as a rule, it was necessary to limit the total solids content of these old lacquers and enamels exclusive of pigment when thinned to spraying viscosity, namely, 100 to 300 centipoises as described above, to less than 13%.

With the advent of the low-viscosity cotton, described by Pitman, and others, it became possible to increase the total solids content of lacquer and enamels, exclusive of pigments, to a marked degree, but in so doing, the ability to increase the gum contents was not materially increased. Also, the low viscosity cotton, contained oxy-cellulose, and hydro-cellulose, and their nitrates in high percentage. As a consequence, they were unstable, and of poor tensile strength. The conditions under which low-viscosity cotton is made, favor the breaking down of the cellulose molecule and the degradation of the cellulose, and lead to a general concession by the lacquer trade that there is greater strength and durability in the high-viscosity nitro-cotton.

Certain fields of the surface coating industry have heretofore been largely beyond the reach of the lacquer and enamel industry by reason of the physical limitations of the lacquers and enamels of the prior-art. Some of these fields are house paints, railroad and steamship paints, household paints, varnishes, and enamels usually sold to householders in cans, and intended to be applied to surfaces by means of a brush. There existed several obstacles to the success of those brushing lacquers. They had to possess a flowing quality that enabled the user to brush, cross brush, and lap without leaving ridges or brush marks.

By the use of alcohols, such as ansol, and hexalin, together with higher esters such as butyl propionate, combined with low viscosity pyroxylin, and the old plasticizers of the prior-art, lacquers have been produced that could be reasonably well applied by means of brushing.

These prior-art brushing lacquers and enamels, however, possessed several faults that have limited their use, although they have been applied to small work such as shelves, chairs, and toys with fairly satisfactory results. The lack of ability of these lacquers and enamels of the prior-art to withstand the destructive effects of sunlight and the weather, and the further facts that in multiple-coat-work, the first and succeeding coats were not inert to the solvents contained in the following coats, and that the degraded cellulose of the low-viscosity nitro-cotton did not provide the wear resistance desired, nor the ability to resist those types of failure of surface coatings known as chalking, alligatoring, and loss of lustre, prevented these prior-art lacquers and enamels from realizing the full scope of useful application that their quick drying qualities would otherwise have made possible.

The desideratum, therefore, has been the discovery of a means whereby spraying and dipping lacquers and enamels containing the strong, tough, and relatively stable high viscosity nitro-cotton, and retaining all of the good properties enumerated elsewhere in this specification, can be manufactured.

Cellulose esters, and particularly cellulose nitrates, are subject to continued polymerization after manufacture. They slowly and spontaneously change their physical properties with time. Amongst the properties which change, is solubility.

Plasticizers of the prior-art may be divided into three classes.

(a) Those, like camphor, triphenyl phosphate and tricresyl phosphate, which possesses some solvent properties for nitro-cellulose before it has polymerized to such an extent as to be no longer soluble. These plasticizers have slow rates of evaporation, and are fugitive constituents of the lacquers, enamels and molding compounds in which they are incorporated.

(b) Those known as drying oils, like linseed oil, which have no solvent properties for cellulose esters, but which gradually take up and combine with oxygen from the air, and in so doing, resinify. In time, the films deposited from lacquers and enamels plasticized with this class of materials, become hard and brittle, and in consequence, of little protective value.

(c) Those materials which may be represented by castor oil, and which are known as non-drying oils. These, like class (b) have no solvent properties for cellulose esters. They are capable of being colloidally dispersed in solutions of cellulose esters by reason of their being miscible with the solvents of lacquer and enamel, and, by their presence among and between the particles of cellulose ester, lubricate, and seem to soften the films deposited from lacquers and enamels in which they are incorporated, so long as enough solvent remains to keep them dispersed. When the true solvents, all of which are fugitive, have disappeared, these non-adhesive plasticizers are squeezed out by the contraction of the unplasticized film, and exude so that they may be wiped from the surface. Heat rapidly expels the true solvents, and, therefore, hastens the exudation of the non-drying oils. This method of forcing out these materials is so well recognized in the lacquer and enamel industry, that a technical term has been applied to it. It is known as hysteresis.

Of these three classes of plasticizers, class a has been most useful. The lacquer or enamel after losing its more highly volatile constituents, retains the slowly-volatile solvents for a time, and, therefore, the solute remains in a state of partial solution as long as some of the solvents remain or retain their solvent properties, or as long as the cellulose ester remains soluble. This distinction between the retention of the solvents and the solubility of the cellulose ester, depends upon the fact that cellulose, when nitrated, is as pointed out above, subject to continued polymerization and, as the polymerization proceeds, becomes less and less soluble in any heretofore-known solvent, whereas, unpolymerized and polymerized nitro-cellulose are both soluble in the new plasticizer herein disclosed. It, therefore, appears that lacquers or enamels or molding compounds, plasticized by the old methods, remain plastic for so long a time only as the nitro-cellulose remains in solution in the slowly-volatile solvents, and that as soon as the solvents disappear, which they do in time, or as soon as the nitro-cellulose becomes insoluble in those solvents, it passes out of solution, and the lacquers deteriorate with the production of the faults known as chalking, alligatoring, etc.

Furthermore, the adhesion of such lacquers as have existed in the past, depends upon the stickiness of such gums and resins as are introduced in order to enhance the adhesion of the lacquers to surfaces coated with them.

In contradistinction to the old and above described method of plasticizing, the new method herein revealed, consists in the production of a plasticizer which when introduced into the substance to be plasticized, possesses the properties of a gum or resin, and is a strictly non-volatile, non-oxidizable, water-resisting, permanently-plastic and permanently-cohesive and adhesive synthetic resinous material.

This non-volatile, water-resistant, permanently-cohesive and adhesive, and permanently-plastic material is soluble in usual solvents for nitro-cellulose, and is, itself, a solvent for nitro-cellulose, and further possesses the property of rapidly promoting the polymerization of nitro-cellulose to the point at which it becomes insoluble in other solvents for nitro-cellulose, but remains soluble in the new material.

This non-volatile, permanently-cohesive and adhesive and permanently-plastic material, is a sticky semi-solid, which, at ordinary temperatures, will slowly flow. It has no boiling point and is stable up to the point at which chemical dissociation begins. It is insoluble in petroleum or coal tar distillates or other hydrocarbons. This material may be regarded as a solvent softener for nitro-cellulose or nitro-cellulose may be regarded as a solvent hardener for this new synthetic material. By putting this new synthetic material into solution along with nitro-cellulose, a molecular dispersion of one in the other throughout the mass is effectuated, and, if the volatile solvents should disappear from the lacquer, enamel or molding compound, there will remain a composite, non-volatile, permanently-cohesive, and adhesive and permanently-plastic film, or object, that is incapable of the disintegration which causes chalking, alligatoring, etc.

That this new synthetic resinous plasticizer desirably promotes the rapid polymerization of nitro-cellulose to its difficultly-soluble, or insoluble state, in heretofore-known solvents, although it is readily soluble and remains dissolved in my new resinous plasticizer, is indicated by the fact that, as shown by tests, films deposited from lacquers compounded of nitro-cellulose and this new resinous plasticizer are, after drying, completely inert to the solvents contained in succeeding coats, and that coatings of steel panels so lacquered and enameled and prepared for weatherometer tests, have failed to be dissolved when soaked for a week in acetone, which is a powerful solvent for nitro-cellulose.

This property, whereby a deposited and dried film of lacquer or enamel containing nitro-cellulose and this new synthetic resinous plasticizer is inert to the solvents of succeeding coats, renders such lacquers and enamels, when properly compounded to give flow characteristics during application, suitable for use as brushing lacquers.

An example of such a brushing lacquer will be given later in this specification.

Tests have shown that films, deposited from lacquers and enamels containing acetyl cellulose and this non-volatile, water-resistant, permanently-cohesive and adhesive and permanently-plastic synthetic resinous plasticizer, are satisfactorily plasticized, although it has not been noted that appreciable solution of acetyl cellulose in this new resinous plasticizer, occurs. However, it has been found that by putting this non-volatile, water-resistant, permanently cohesive and adhesive, and permanently-plastic material into solution containing as its solute, acetyl cellulose, or any hard film-forming substance with which it is compatible, and which is soluble in the same solvents that dissolve this new resinous plasticizer, a molecular dispersion of the plasticizer throughout the mass is effectuated, and that if the volatile solvents should disappear from the lacquer or enamel or molding composition, there will remain an intermolecular film or cement, which, by reason of its adhesiveness, not only will bind together the associated molecules of the acetyl cellulose, but will also cement the entire mass to the surface upon which the lacquer or enamel has been applied, with the result that, no matter how polymerization of the acetyl cellulose may subsequently proceed, and no matter how hard and horny the acetyl cellulose may become, when considered in its state of molecular division, its particles are still bound together by a permanently-plastic, pliable, adhesive material which, because of its complete lack of volatility, and its permanent adhesiveness, remains permanently in place upon and insures an extremely long life to the lacquered or enameled surface, thus completely preventing the disintegrations which are known as chalking, alligatoring, etc.

It will be apparent from the foregoing description, that this non-volatile, water-resistant, permanently cohesive and adhesive and permanently plastic material will act as an efficient and desirable binder for the segregated molecular or colloidal particles of any coating material, lacquer, enamel or molding compound, to which particles it will permanently adhere.

It will also be apparent from the foregoing that this resinous plasticizer herein described is a non-fugitive component of coating materials, lacquers, enamels, and molding compounds in which it may be effectively incorporated, and, as such, permanently conserves the essential properties of those substances; whereas, coating materials, lacquers, enamels and molding compounds, as now made, initially include substances such as cellulose esters which are bound together by other substances, which other substances in time fail to effectuate the binding of said particles, either because they evaporate, or because of some alteration in the solute, regardless of whether it is nitro-cellulose or some other substance.

The new resinous plasticizer is, therefore, one which, in and of itself, is stable, is non-volatile, and is permanently adherent to other constituents of any coating material, lacquer, enamel or molding compound, whatever they may be, in which it may be effectively incorporated. It is therefore evident that the longevity of a lacquer or varnish is entirely dependent upon the character of its plasticizer, and that the deteriorations of these substances, as heretofore produced, is chiefly due to the elimination, the inactivity or the lack of stability of their plasticizers.

Lacquered panels, exposed for breakdown tests in a weatherometer, have demonstrated the longevity of lacquers compounded with the new plasticizer, herein described, as compared with commercial lacquers compounded with plasticizers such as castor oil, triphenyl phosphate, tricresyl phosphate, and dibutyl phthalate.

These tests have shown that, whereas the best obtainable commercial lacquers compounded with fugitive plasticizers were completely destroyed in from 250 to 300 hours' exposure in the weatherometer, those lacquers that were compounded with the plasticizer herein described as non-volatile and non-fugitive suffered no detectable change after 718 hours of exposure, under the same conditions, even though the effort to detect a change was conducted with the aid of a powerful microscope.

The product, thus produced, is a permanently-plastic and non-brittle semi-fluid resin that is suitable for use in coating materials, lacquers, enamels and molding compounds, and capable of imparting desirable plastic properties thereto. It differs from fluent substances such as castor oil, which, blended with coating materials, lacquers, enamel and molding compounds, merely acts as a non-adhesive lubricant for the other constituents and readily exudes therefrom by hysteresis. It differs from such substances as camphor, triphenyl phosphate, tricresyl phosphate and dibutyl phtalate which in time disappear from the coating, lacquers, enamel or molding compound and are therefore fugitive.

The process of plasticizing herein described is of importance to the lacquer industry in that it provides, in one lacquer, the properties required for a "primer" coat, that is, the first coat applied for the purpose of obtaining adhesion to the object or surface being lacquered, and at the same time provides a finishing coat by producing a superior gloss and producing within the lacquer the ability to permanently resist the effects of ageing that have heretofore so quickly destroyed lacquered surfaces.

General experience in the surface-coating industries, has shown that organic surface coatings exposed to the weather, and particularly to sunlight, deteriorate rapidly, and tests, conducted to disclose the reasons therefor, have established the fact that the short wave-length radiations in the ultra-violet end of the spectrum of sunlight, are the principal cause of the deteriorations noted. Much work has been done along that line of investigation, and it is generally conceded that no organic coating, whether it be oil and resin varnish or a pyroxylin lacquer or enamel, is proof against the destructive influence of the short wave-length radiations, unless it be so thoroughly pigmented that the solid pigment particles will absorb and prevent the passage of these short wave-length radiations into and through the coating or film. However, no radiations having a wave length longer than 315 millimicrons, are known to have a destructive influence on surface coatings. Tests, conducted to determine the light transmission characteristics of my new synthetic resinous plasticizer, reveal the fact that while this material is highly transparent to the light radiations in the visible range, and, therefore, can be used to make so-called water-white clear lacquers, it is opaque to all radiations having a wave length shorter than 317 millimicrons. The practical aspect of this property of the new resinous plasticizer, is that clear lacquers may now be manufactured with my invention, which, when exposed to the weather and sunlight, are more fully protected against the destructive effects of short wave-length radiations than were the lacquers of the prior art when pigmented.

Other tests have shown that films of applicant's resinous plasticizer having a thickness of one millimeter will pass 70% of spectral emanations of a wave length of 400 millimicrons; but, if the substances from which said resinous plasticizer is produced should contain contaminations of various kinds, or are, otherwise, variable, the percentage of transmitted spectral emanations will vary, and, in some instances, may be as low as 49%.

Test conducted in a weatherometer, in which coated panels are subjected to as close an approach to sunlight as can at present be achieved artificially, and including a larger percentage of short-wave radiations than does sunlight, even on high mountains, alternated with high and low temperatures and rain, have shown that lacquers manufactured according to my invention, have produced coatings which indicate that they resist these destructive agencies over three times as long as the best commercial lacquers of the prior art. These new lacquers and enamels can, therefore, be successfully used for coating objects subjected to outdoor exposure. Furthermore, these coatings are unaffected by grease, oil, gasoline, benzol, toluol, naphtha, or petroleum.

I have made films composed of nitrocellulose and this synthetic resinous plasticizer. Such films exhibit properties that excel the properties of celluloid. They may be made transparent. They may be colored as desired. They may have pigments incorporated in them to render them opaque. Such films are elastic, flexible, odorless, possessed of great tensile strength and may be folded and unfolded without cracking or suffering any apparent damage. They may be molded according to the well-known methods used for molding celluloid.

Because of the permanence of this plasticizer, these films will retain these properties for an indefinite length of time.

I shall now proceed to describe in detail the manufacture of my new synthetic substance and give examples of its use in lacquers, enamels and molding materials. It is to be understood that the examples given are illustrative of my invention, which, of course, is not limited thereto, since many changes may be made therein without departing from the spirit and scope of the invention.

The process of manufacturing this non-volatile, water-resistant, permanently-cohesive and adhesive and permanently-plastic synthetic material, may be carried into effect by subjecting a mixture in substantially the proportion of one molecule each of diethylene glycol and phthalic anhydride, to a temperature of from 110 to 150 degrees centigrade, but preferably 130 degrees centigrade, and continuing the heating and consequent condensation and polymerization until the desired product has an acid number between 112 and zero, but preferably just below 24.

It is to be understood that during the heating, condensation and polymerization of the above mixture, the acid number gradually reduces from above 180 to zero, depending upon the length or duration of the continuation of the heating. At first, that is, in the very early stages of the condensation, the ingredients seem to be in solution in each other, but the solution is water-soluble. As the condensation followed by polymerization, proceeds, the solution becomes water-insoluble, at an acid number of approximately 112. At that time, it is a liquid resin, and greater quantities of cellulose ester are required to harden it, and overcome its tackiness, than would be required if the polymerization had proceeded to still lower acid numbers. As an opposite extreme, the solution polymerized to an acid number of zero, is a plastic solid at normal temperatures, and requires comparatively little cellulose ester to overcome its tackiness, and produce satisfactory coatings, films and objects. It will be seen, therefore, that between the acid numbers of 112 and zero, there is a gradual transition in the state of being of the condensed and polymerized material, and it may therefore be said that an infinite number of plastic resins exist in the above-indicated range. All of them are useful, and are comprised within the scope of this invention, although I prefer to stop transition at an acid number slightly below 24, because of the fact that the plastic properties of the synthetic resinous plasticizer, as properties made, and stopped at an acid number just above made, and stopped at an acid number just below 24, are such as to give excellent results with nitrocellulose of high viscosity characteristics.

Other cellulose esters, and other hard film-forming substances capable of being plasticized by synthetic resinous plasticizers of this type, may very well require that the transition be stopped at other acid numbers than that which I now prefer.

As the acid number is reduced, the freezing point of the synthetic resinous plasticizer is raised. That is to say, at any given temperature, resins of this series having higher acid numbers will be more liquid or plastic than those resins of lower acid numbers. It will, therefore, be seen that where lacquers or enamels are to be subjected to very low temperatures, use may advantageously be made of resins having acid numbers higher than 24.

The condensation and polymerization above outlined are preferably effectuated by me in aluminum vessels, although vessels made of other materials which will not be attacked by the ingredients may be employed.

Small batches of material may be condensed and polymerized without the necessity of constant agitation, although it is my practice to thoroughly and continuously agitate the material during the entire period of heating.

The product resulting from the condensation and polymerization of phthalic anhydride and diethylene glycol, if produced as above described and without other attention or modification, will produce a synthetic resin having the plasticizing properties above described, but, by reason of the heat required for polymerization producing simultaneously objectionable discoloring dissociation compounds, it will be of dark color and, so far as visual inspection of the sticky mass so produced is concerned, it will be unattractive to one not aware of its extraordinary usefulness as a plasticizer, and even to one conversant with its plasticizing properties, the dark color is likely to create the belief that it will be objectionable as a material to be used in the manufacture of clear water-white lacquers and in the manufacture of white pigmented lacquers, by reason of the presence of the objectionable coloring compounds formed as above described.

I discovered that the inclusion of ray-controlling substances, the principles of the effects of which are fully set forth in my co-pending patent application filed August 20, 1931, Serial No. 558,329, was effective in preventing the formation of undesirable color characteristics during the condensation and polymerization of this resinous plasticizer, and that the much-desired light color of the resin and its transparency in the visible range could be so produced. I prefer, therefore, when making this plasticizer, to include in the batch at the time of beginning the heating, a ray-controlling substance as described in the above-cited co-pending application, and specifically in this case I prefer to use .0005 per cent. of copper nitrate.

Throughout this specification emphasis has been placed upon the fact that nitrocellulose of high viscosity characteristics is entirely suitable for the manufacture of lacquers and enamels having a high total solids content, providing this resinous plasticizer be employed in sufficient quantity to provide the body characteristics in the lacquer without unduly raising the viscosity of the lacquer.

It is not intended to disclaim the use of nitrocellulose having low viscosity characteristics, such as that produced by Pitman and others, because such low-viscosity nitrocellulose is satisfactorily plasticized by my new resinous material, and by its use lacquers having suitable viscosity for spraying and dipping may be produced. Such lacquers made with the low-viscosity nitrocellulose can be notably improved beyond the limits of the prior art by being given a total solids content and consequent fullness far greater than ever before possible.

As an example of a lacquer suitable for spraying and employing my invention, the following is cited:

Solids

| | Ounces |
|---|---|
| Dry weight R. S. nitrocellulose, 60 to 80 seconds viscosity | 3 |
| My resinous plasticizer | 20¼ |

Solvent Mixture

| | |
|---|---|
| Toluol | 50 |
| Denatured ethyl alcohol, 188 proof | 15 |
| Ethyl acetate (85 to 88% ester and balance ethyl alcohol) | 20 |
| Amyl acetate | 15 |
| Ethyl lactate | 5 |
| Mono ethyl ether of ethylene glycol | 20 |
| Butyl mono ethyl ether of ethylene glycol | 3 |

Procedure

Dissolve the resin in the ethyl acetate.

Wet the nitrocellulose with the toluol and the denatured alcohol.

Mix the amyl acetate, ethyl lactate, mono ethyl ether of ethylene glycol and butyl mono ethyl ether of ethylene glycol.

Add half of the above mixture to the wet nitrocellulose and mix thoroughly.

Add the solution of resin and the remaining mixed solvent and thoroughly mix the entire batch.

As another example of spraying lacquer, I may use:

Solids

| | Ounces |
|---|---|
| Dry weight R. S. nitrocellulose of 20 to 30 seconds viscosity | 4½ |
| My resinous plasticizer | 20¼ |

Solvent mixture and procedure

Same as in the first example above given.

As an example of a brushing lacquer, the following is presented:

Solids

| | Ounces |
|---|---|
| Dry weight R. S. nitrocellulose of 60 to 80 seconds viscosity | 3 |
| My resinous plasticizer | 20¼ |

Solvent Mixture

| | |
|---|---|
| Zylol | 14 |
| Denatured ethyl alcohol, 188 proof | 15 |
| Mono ethyl ether of ethylene glycol | 32 |
| Ethyl lactate | 8 |
| H. I. F. naphtha (H. I. F. means high flash point) | 10 |
| Amyl acetate | 15 |
| Ethyl oxy-butyrate | 8 |
| Ethyl acetate | 10 |

Procedure

Dissolve the resin in the ethyl acetate.

Wet the nitrocellulose with the zylol and the denatured alcohol.

Mix the mono ethyl ether of ethylene glycol, ethyl lactate, H. I. F. naphtha, amyl acetate and ethyl oxy-butyrate.

Add half of the above mixture to the wetted nitrocellulose and mix thoroughly until the nitrocellulose is completely dissolved.

Add the solution of the resin and the remaining mixed solvent and thoroughly mix the entire batch.

As another example of a brushing lacquer, the following is presented:

Solids

| | Ounces |
|---|---|
| Dry weight R. S. nitrocellulose of 20 to 30 seconds viscosity | 4½ |
| My resinous plasticizer | 20¼ |

Solvent Mixture

Same as first example of brushing lacquer.

Procedure

Same as in previous examples.

It will be noted, from the illustrative formulae given above, that my new resinous plasticizer reverses the practice of the prior art in the following manner. In the prior art, it was found that the production of useful lacquers required that the total solids, other than pigment, should be so proportioned that the cellulose ester constituted 50% or more than 50% of such total solids; that, if the resin or gum, which was the weakest component of any prior-art lacquer, be included in the lacquer to an extent greater than 25% of the total solids, the resulting films lacked coherency, and that the further increase of resin or gum made this defect more prominent; but, in contrast to the practice of the prior art, my new resinous plasticizer may be incorporated in lacquers and enamels in such manner that the cellulose ester constitutes less than 50% of the total solids, other than pigment, and that said new plasticizer constitutes more than 50% of the said total solids, and, in some cases, as much as 87%, and still produce lacquers having great cohesiveness.

The reason for this remarkable improvement, is that small quantities of high-viscosity cellulose esters act effectively to so harden my new plasticizer that it constitutes the major coherent and adhesive portion of the total solids of the lacquer.

Having thus described my invention, what I claim is:

1. The process of producing a resinous plasticizer, which consists in subjecting phthalic anhydride and diethylene glycol to a temperature of approximately 130 degrees centigrade until a desired condensation product is produced.

2. An organic nitro-cellulose coating material including, as a component, a plasticizer which is the polymer of diethylene glycol and phthalic anhydride produced at a temperature approximating 130 degrees centigrade.

3. A fusible, water-resistant phthalic anhydride-diethylene glycol resin condensed and polymerized at a temperature approximating 130° C. and having an acid number between 112 and 0.

ALLEN D. WHIPPLE.